May 21, 1940.  T. H. MacGEORGE  2,201,781
HATCH COVER
Filed Aug. 10, 1936  2 Sheets-Sheet 1
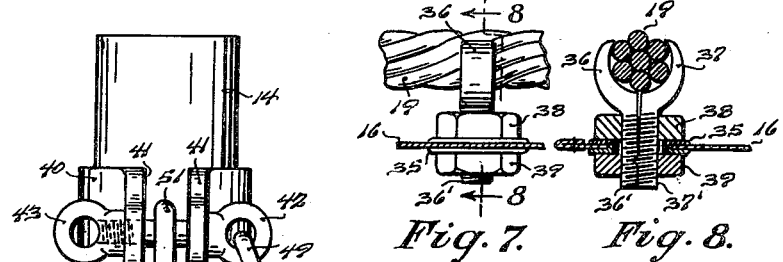
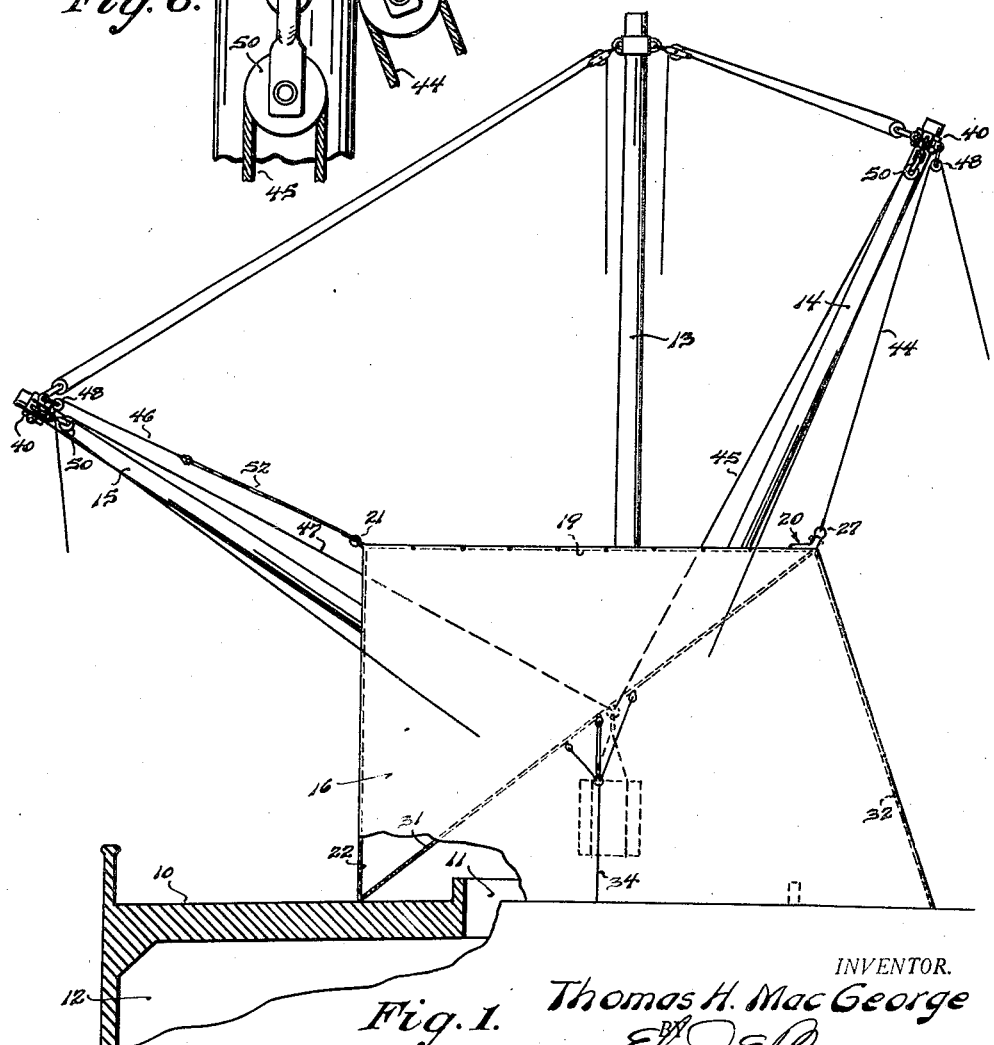
INVENTOR.
Thomas H. MacGeorge
ATTORNEYS.

May 21, 1940.　　T. H. MacGEORGE　　2,201,781
HATCH COVER
Filed Aug. 10, 1936　　2 Sheets-Sheet 2
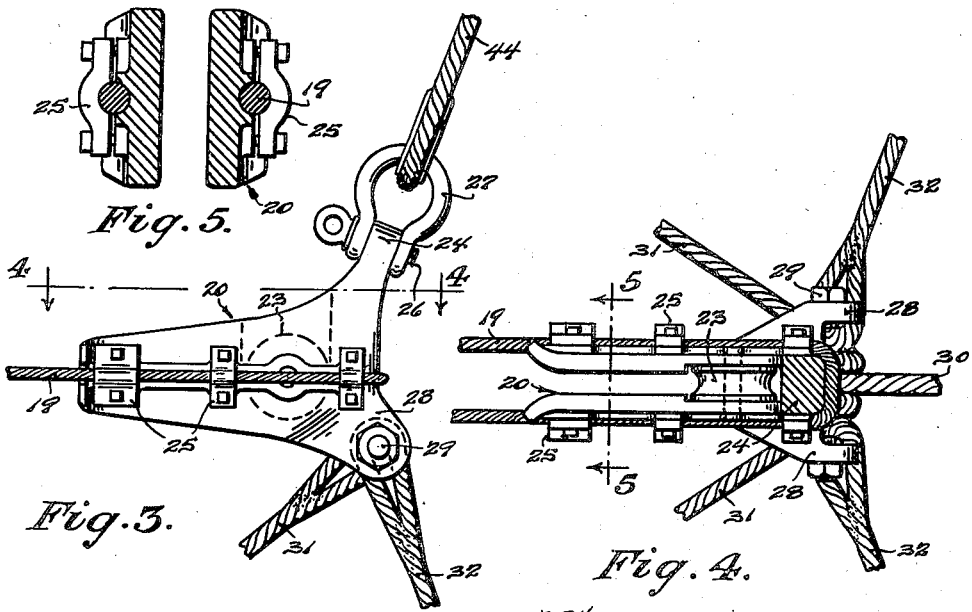
Fig. 5.
Fig. 3.
Fig. 4.
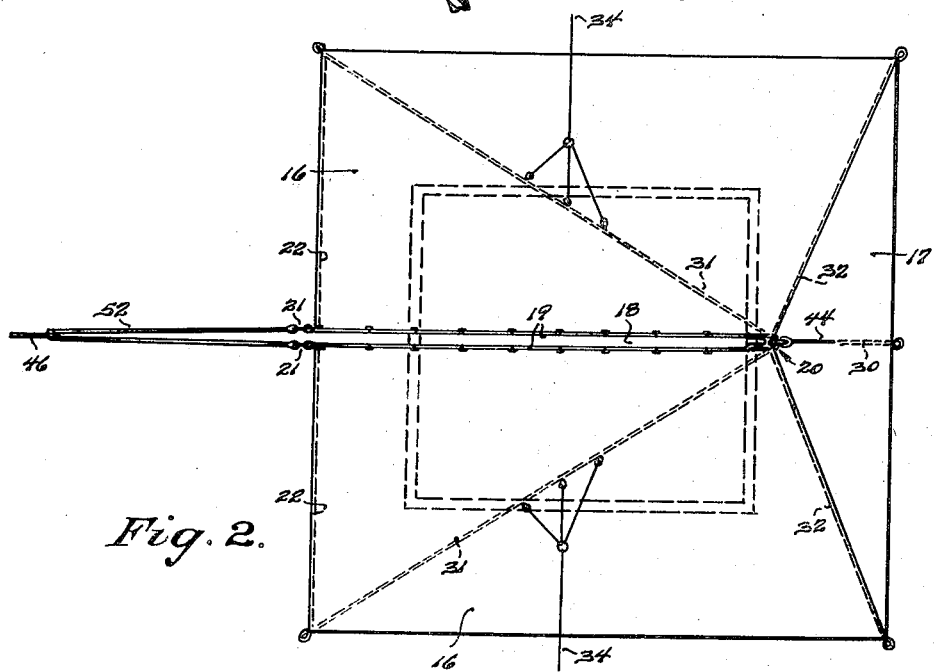
Fig. 2.
INVENTOR.
Thomas H. MacGeorge
BY
ATTORNEYS.

Patented May 21, 1940

2,201,781

UNITED STATES PATENT OFFICE 2,201,781

HATCH COVER

Thomas H. MacGeorge, Seattle, Wash., assignor to Seattle Tent & Awning Co., Seattle, Wash., a corporation of Washington Application August 10, 1936, Serial No. 95,112

14 Claims. (Cl. 135—5)

This invention relates to hatch covers of the character used as protection against adverse weather conditions in the loading and unloading of cargo from open hatchways and especially is directed to advanced supporting means for the hatch cover as distinguished from the means therefor illustrated and described in U. S. Patent No. 1,640,188 of John F. Grunbock, issued August 23, 1927.

Stated generally, the character of hatch cover to which the present invention has reference is that which provides a cable-lined ridge slot for the reception of one of two cargo lines and, according to the teachings of the above identified patent, the cable which acts as a chafing member for the cargo line is comprised of two independent laterally spaced lengths connected at each end of the ridge slot to clevis-type couplings, these couplings being supended from the boom arms of the vessel. The tent itself is suspended wholly from the chafing cable by cord seizings passed between the strands of the cable, there being no interconnection as between the tent-reinforcing ropes which are stitched to the fabric and the boom-suspended cable couplings.

It is a particular object of the present invention to provide an especially advantageous form of block coupling designed to replace the clevis-type member at the rear end of the ridge slot and so constituted as to afford interconnection not only between the chafing cable and the suspension line but also between said chafing cable, the suspension line, and the several tent-reinforcing ropes.

A further and particular object of the invention is to provide advanced means by which the chafing cable is attached to the marginal edges of the tent lying at each side of the ridge slot.

The invention has as a still further and particular object the provision of improved means by which the forward and rear suspension lines are attached to the booms and through the use of which the cargo lines may be employed in a more efficient manner in that possibility of fouling between the suspension lines and the cargo lines is prevented, this improved boom fitting, moreover, allowing reversible mounting of the hatch cover to accommodate loading or unloading from either the port or starboard side of the vessel.

Further and still more particular objects, together with the foregoing, will become apparent in the course of the following description and claims, the invention consisting in the novel construction, adaptation, and combination of parts hereinafter described and claimed.

In the accompanying drawings:

Figure 1 is a view, partly in transverse vertical section and partly in elevation, representing a portion of a marine vessel with a hatch cover embodying the advancements of the present invention applied thereto.

Fig. 2 is a top plan view of the hatch cover with the suspension lines which extend from each end of the same shown fragmentarily.

Fig. 3 is a side elevation taken to an enlarged scale illustrating the supporting block which is employed at the rear end of the ridge slot, the several lines attached thereto being shown fragmentarily.

Fig. 4 is a horizontal section taken on the line 4—4 of Fig. 3 and Fig. 5 is a transverse vertical section taken on the line 5—5 of Fig. 3, the hatch cover in each of said Figs. 3, 4, and 5 being deleted.

Fig. 6 is a detail elevational view of the boom fitting illustrating the pulley blocks attached thereto which act to receive the cargo and suspension lines.

Fig. 7 is a detail top plan view of the improved seizure devices which interconnect the chafing cable and the marginal edges of the tent at each side of the ridge slot; and Fig. 8 is a transverse vertical section taken on the line 8—8 of Fig. 7.

The numeral 10 in the drawings designates the deck of a vessel, 11 the hatchway therethrough leading to the vessel's hold 12, and 13 the vessel's mast which supports booms 14 and 15. The hatch cover is comprised of inclined side walls 16 and a back wall 17, the front of the tent-like structure thereby formed being open and the two side walls at the top of the tent being disposed in spaced relation to produce a longitudinally extending ridge slot 18. I denote the chafing cable which lines the marginal edges of the ridge slot by 19, the present invention forming the same from a single length of cable, preferably metal, which is turned at its mid-length about a supporting block 20 disposed at the rear of the ridge slot, the free ends of the cable extending in parallel relationship to the forward end of the slot and engaging clews or the like 21. Thimbles carried by the clews receive tent-reinforcing ropes 22 which are attached to the tent along the forward edge of the side walls.

Said block 20 I form to a relative U-shape in top plan, the produced throat at its rear terminus receiving a sheave 23 and the bight-forming portion of the chafing cable being brought about the exterior and received in longitudinal grooves (Fig. 5) wherein the same is clamped by cap members 25. At its rear the block provides a rearwardly inclined upward extension 24 apertured to receive a pin 26 by which a clevis 27 is attached and, also at the rear end below the plane of the cable bight, apertured lateral ears 28 receiving a horizontal bolt 29. Said bolt, as indicated, engages the terminal loops of a plurality of tent-reinforcing ropes comprised of a member 30 attached to the tent on the median line of the rear wall and receiving a stay-engaging ring at its lower end, a member 31 leading diagonally to the forward end of the side wall at each side of the tent, and members 32 leading to the rear end of the side wall's lower edges. Said members 31 and 32 similarly are fitted with stay-engaging rings, the members 31 additionally being connected by exteriorly disposed rings with laterally extending stays 34. While not illustrated, the tent is provided with flaps which depend over the last-named rings to cover the openings through which connection is had with the interiorly disposed diagonal ropes 31.

As respects the connection between the chafing cable and the marginal edges of the tent, said edges at spaced intervals are fitted with grommets 35 and for engagement therewith I provide seizure devices consisting in clamps formed of companion independent cable-engaging jaws 36 and 37 having approximate semi-cylindrical threaded shanks 36' and 37' which interfit with one another and receive coacting nuts 38 and 39 between which the grommets are engaged. The jaws are applied over the cable and clamped by advancing the nut 38 to have the shanks extend in an approximate horizontal plane laterally from the cable, following which the grommets are inserted over the shanks and the nuts 39 applied to clamp the grommets against the nuts 38. Said jaws are of a length to extend only slightly beyond the diametrical center of the cable whereby an uninterrupted chafing surface along the slot-defining inner surface is obtained.

Having reference to the boom arms 14 and 15, each are fitted with a clamping collar 40 through the terminal flanges 41 of which a threaded eye-bolt 42 is received, the protruding threaded end of the eye-bolt being engaged by a clamping eye-nut 43, said bolt and nut forming in effect a double-eyed pintle of which one eye lies at the upper side and one eye at the under side of the respective inclined booms with the pintle shank projecting across the interstice between the collar flanges. Each of said boom fittings acts to support a suspension line to the adjacent end of the hatch cover as well as a cargo line for loading and unloading cargo and the above described arrangement of parts is with the particular object of affording ready attachment of the tent-suspending lines irrespective of the side, port or starboard, from which operations are being carried on. More especially, each of said cargo and suspension lines pass about pulley blocks suspended from the fittings and it is necessary in order that fouling between cargo and suspension lines be prevented that the suspension line, indicated by 44, for the rear end of the tent lie to the rear of the cargo line 45 and that the suspension line 46 for the forward end of the tent lie above the forward cargo-line 47, in other words lie in reverse relationship relative to the centrally disposed mast 13. The boom fitting which I have devised accommodates this reversal of relative location, the pulley blocks 48 through which the suspension lines pass being formed with a hook 49 whereby the bill of the same may be engaged with either of the two oppositely positioned eyes of the respective boom fitting, the pulley blocks 50 through which the cargo lines 45 or 47, as the case may be, pass being permanently attached to the collar assembly by means of a ring 51 received about the pintle shank to lie in the interstice between the collar flanges. The central location of the ring 51 equalizes the thrust transmitted from the load to the boom.

The suspension line 44 which supports the rear end of the hatch cover engages the clevis 27 of the block 20 while the suspension line 46 for the forward end of the hatch cover engages a sling 52 having its free ends secured to the clews 21, said sling constituting an extension of the ridge slot 18.

It is believed unnecessary to specifically set forth the manner by which loading and unloading through the instrumentality of the loading lines 45 and 47 is carried on as the same is common practice.

I intend that no limitations be implied other than as may be expressly set forth in the hereto annexed claims.

What I claim, is:

1. In combination with a hatch cover formed with side walls the upper edges of which are separated to define a ridge slot for the operation therein of a cargo line, a block carried by the cover at the end of the slot and adapted for connection with a suspension line for supporting the cover, re-inforcing ropes disposed interiorly of the side walls and attached to and running diagonally from said block to the opposite lower edge of the respective side walls, and means comprised of exteriorly disposed stays directly connected to each of said diagonal re-inforcing ropes and adapted to extend laterally from the side walls for attachment to securing devices on the deck of the vessel.

2. A block for attaching the re-inforcing ropes of a hatch cover of the character described to a suspension line by which the hatch cover is supported, said hatch cover consisting in a tent-like structure of which the side walls are spaced apart at their upper ends to define a ridge slot for the operation therein of a cargo line, the re-inforcing ropes being comprised of lines extending along the upper and rear edges of the side walls and diagonally between the upper rear and the lower forward corners, said block comprising a member of an approximate U-shaped plan configuration adapted to be received at the rear end of the ridge slot and formed exteriorly with means by which the re-inforcing ropes which lie at each side of the ridge slot are attached, the rear end of the block providing laterally spaced apertured ears for the reception of a horizontal bolt by which the upper ends of the other re-inforcing ropes are attached and having a rearwardly inclined upward extension formed to accommodate the attachment of the suspension line, said upward extension lying in the approximate longitudinal median line of the block with the ears lying in planes spaced equidistantly at opposite sides of the same.

3. In combination in a hatch cover of the character described providing a tent-like structure formed with a ridge slot for the operation therein of a cargo line and having a flexible guard strip marginally defining said ridge slot, clamping devices engaging the guard strip at spaced intervals and interconnecting the same with the upper edges of the tent side walls.

4. In combination, a hatch cover consisting in a tent-like structure formed with a ridge slot for the operation therein of a cargo line, a flexible guard strip marginally defining said ridge slot, the upper edges of the side walls lying at each side of the guard strip being provided with grommets disposed at spaced intervals of the length of the ridge slot, and means received through the eye of the grommets and engageable with the guard strip for securing the guard strip and the side wall edges, one relative to the other.

5. In a hatch cover for the purpose described consisting in a tent-like structure having the upper edges of the side walls spaced apart to provide a ridge slot for the operation therein of a cargo line, an apical re-inforcing means extending longitudinally along each side of the ridge slot to operate as a guard for chafing purposes, and clamps attached to said guard and to the upper edges of the side walls for connecting the guard to the side walls.

6. A hatch cover comprised of the combination of a member formed with side walls the upper edges of which are spaced apart to define a ridge slot for the operation therein of a cargo line, means attached to the upper edges of said side walls and extending in parallel relationship longitudinally of the ridge slot to operate as chafing strips for the ridge slot, and a flexible sling having its free ends interconnected with the forward ends of the chafing strips and extending outwardly therefrom to serve as a prolongation of the ridge slot, said sling being adapted to be secured to the vessel for suspending the forward end of the cover.

7. A hatch cover comprised of the combination of a member formed with side walls the upper edges of which are spaced apart to define a ridge slot for the operation therein of a cargo line, and a support for the end of said cover comprising a flexible sling having its free ends interconnected with the cover at the forward ends of the slot and extending outwardly therefrom as a prolongation of the slot.

8. A hatch cover comprised of the combination of a member the side walls of which are quadrilateral in plan and re-inforced by ropes disposed interiorly of the cover and attached to and runing diagonally of the side wall from one extremity of the upper edge to the opposite extremity of the lower edge thereof, and exteriorly disposed stays directly connected to said diagonal re-inforcing ropes and arranged to extend laterally therefrom for attachment to securing devices on the deck of the vessel.

9. An end block for the ridge slot of a hatch cover of the character described, the slot being bordered along each side by flexible guard strips accommodating movement of a cargo line between the same, said block being of U-shaped plan configuration providing means for clamping the guard strips thereto and forming a slot operating as a prolongation of the ridge slot, the block having a sheave supported therein to prevent chafing of the cargo line as the latter is carried to the end limits of the slot.

10. An end block for use with a hatch cover of the character providing a ridge slot for the operation therein of a cargo line and functioning to attach the reinforcing ropes of said cover to a suspension line by which the hatch cover is supported, said end-block being of U-shaped plan configuration forming a slot operating as a prolongation of the ridge slot of the cover and having its heel part, which is to say the closed end of the U, formed with upwardly and downwardly projecting extensions of which the former is formed to accommodate the attachment of the suspension line and of which the latter is formed to accommodate the attachment of the tent-reinforcing ropes.

11. The described end block of claim 10 wherein the extension for attaching said tent-reinforcing ropes comprises a pair of complementary ears disposed at opposite sides of the longitudinal median line of the block and pierced transversely for the reception of a horizontal pin.

12. An end-block for use with a hatch cover of the character providing a cable-lined ridge slot and functioning as a coupling to attach a suspension line for the cover to said cable and also to reinforcing ropes for the cover, said end-block being grooved along its sides and being fitted with clamps for securing the cable in the grooves and, above and below the plane of said cable-receiving grooves, being formed with means accommodating, respectively, the attachment of the suspension line and the tent-reinforcing ropes to the block.

13. An end-block for a hatch cover of the character providing a cable-lined ridge slot, the block being characterized in that means are provided for the attachment thereto of a plurality of tent ropes reinforcing the cover, a suspension line for supporting the cover, and the cable, thereby to function as a coupling connecting said cable, the suspension line, and the tent ropes, each to the others.

14. An end-block according to claim 13, said cable in its application to the block being turned about the latter, and wherein said means for the attachment of the suspension line and the tent ropes to the block lie, respectively, above and below the bight of the applied cable.

THOMAS H. MacGEORGE.